LEAF SPRING VEHICLE SUSPENSION

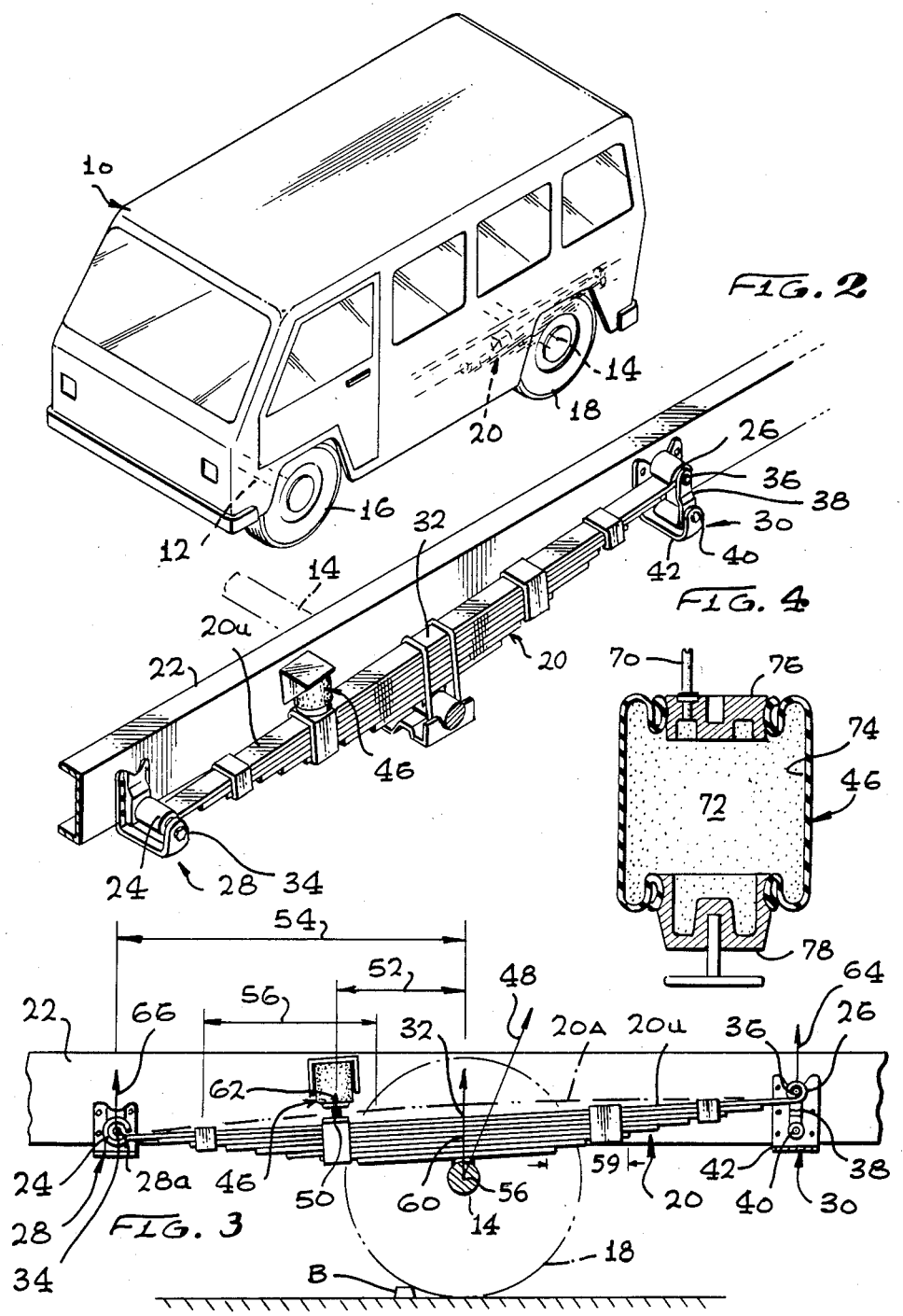

REFERENCE TO RELATED APPLICATION

This is a continuation-in-part of U.S. patent application Ser. No. 494,081, filed May 12, 1983, now U.S. Pat. No. 4,494,772.

BACKGROUND OF THE INVENTION

A rear axle of a vehicle is typically mounted on the frame by a leaf spring whose opposite ends are continually held to the frame by connectors and whose middle portion lies directly over the rear axle. The leaf spring is preferably constructed so that under quiescent conditions its top is flat. When the spring is "reversely" curved, so that its top surface is convex, the ride is harsh. One way that has been used to avoid reverse bending is to place an air sleeve or air bag between the frame of the vehicle and the axle. However, this has been found to still result in a relatively harsh ride. An air sleeve would appear to be a good mechanism for helping to absorb shock in combination with the length of the leaf spring, but none of the systems known to applicant have produced a very smooth ride.

It may be noted that air sleeves have been proposed in the patent literature for use in conjunction with leaf springs to support one end of the leaf spring, with all of the load transmitted through the front portion of the leaf spring being transmitted through the air sleeve. In two patents of this type, U.S. Pat. No. 3,309,107 by Chieger (FIGS. 5 and 7) and U.S. Pat. No. 3,063,732 by Harbers, air bags or sleeves have been placed at the front of the leaf spring so all shock has been transmitted through the air bags. However, such air bags must be large so they are capable of transmitting large forces, since at least half of the weight supported by the adjacent vehicle tire must be transmitted through the air bag. Also, the air bag then does not avoid reverse spring curvature. An air sleeve assembly which enabled most of the shock to be transmitted through ordinary connectors, with a moderately low capacity air sleeve serving to supplement the leaf spring and prevent reverse curvature of the leaf spring, and which resulted in a very smooth ride, would be of considerable benefit.

SUMMARY OF THE INVENTION

In accordance with one embodiment of the present invention, an improvement is provided for a suspension system of the type wherein a portion of a vehicle frame is continually attached to the ends of a leaf spring whose middle is supported on a vehicle axle. The improvement enables most of the weight of the vehicle frame that is carried by a tire, to be carried by the leaf spring while effectively absorbing shocks. The improvement includes an air sleeve device which is coupled between the leaf spring and the vehicle frame to support some of the weight of the vehicle frame on a middle portion of the spring. The air sleeve device lies forward of the axle but rearward of the connector which connects the front end of the spring to the frame. The air sleeve device preferably lies between 25% and 75% of the distance between the axle and the connector of the front end of the spring.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a vehicle which utilizes the vehicle suspension system of the present invention.

FIG. 2 is a perspective view of a portion of the vehicle of FIG. 1, showing a suspension arrangement therein.

FIG. 3 is a side elevation view of the arrangement of FIG. 2.

FIG. 4 is a sectional view of an air sleeve device of the arrangement of FIG. 3.

DESCRIPTION OF THE PREFERRED EMBODIMENT

FIG. 1 illustrates a vehicle 10 which has front and rear axles 12, 14 that are supported on front and rear wheels 16, 18. As shown in FIG. 2, the axle 14 supports a leaf spring 20 which, in turn supports the chassis or frame 22 of the vehicle. The leaf spring has front and rear ends 24, 26 that are connected through connectors 28, 30 to the frame, and has a middle 32 that is supported directly over the rear axle 14.

The leaf spring 20 includes several leafs of varying length, with the uppermost leaf 20U having ends extending in loops to form the ends of the spring. The connector 28 is attached to the front end 24 of the spring by a bolt 34 that passes through the looped end of the spring, while the front connector itself is attached by several bolts to the vehicle frame. Thus, the front of the spring is continually connected to the vehicle frame, even in the quiescent condition of the vehicle, to continually transfer part of the frame weight to the front end of the spring for transfer to the axle 14. The rear end 26 of the spring is formed by a loop of the top leaf. The rearward end 26 is held by a bolt 36 that passes through it and the upper end of a shackle 38. The lower end of the shackle is pivotally mounted about a lower bolt 40 on a lower rear connector 42 that is bolted to the vehicle frame. A portion of the vehicle frame weight is continually supported through the rear connector 42, the shackle 38, and the rearward end of the spring 26. In this way, the entire length of the leaf spring continually carries part of the weight of the vehicle frame.

In the absence of an air bag or air sleeve 46, the leaf spring can undergo reverse bending, as indicated at 20A in FIG. 3, wherein the upper surface of the leaf spring becomes convex. In that case, the leaf spring cannot absorb shocks as well and the vehicle frame is subjected to large shocks from a road of given unevenness. It is possible to apply an air sleeve at the position 32 which is directly over the axle 14, to slightly depress the middle of the leaf spring to avoid reverse bending. However, applicant has found that this leads to a harsh ride. Applicant has also tried the placing of an air sleeve between the vehicle frame 22 and the rearward portion of the spring which lies between the middle 32 and the rearward end 26. Applicant has found that this also results in a harsh ride. It is believed that this is due to the fact that when a large bump B in the road is encountered, the vehicle axle will move rearwardly as well as upwardly, as in the direction indicated by arrow 48. An air sleeve along the rearward portion of the vehicle will directly transmit much of this shock directly to the frame of the vehicle, thereby resulting in a sudden shock experienced by a rider in the vehicle.

In accordance with the present invention, applicant applies an air sleeve 46 between the vehicle frame 22 intended that the claims be interpreted to cover such modifications and equivalents.

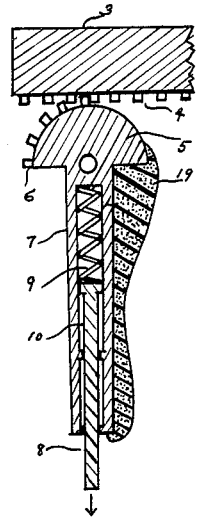

What is claimed is:

1. In a vehicle which has a frame, an axle holding a wheel on either side of the frame, a leaf spring on either side of the frame, each leaf spring having front and rear ends and having a middle attached to said rear axle, and front and rear connectors attaching the front and rear ends of said spring to said frame in continuous connection therewith, the improvement comprising:
   an auxiliary load transfer device which is resiliently compressible, said device having an upper end connected to said vehicle frame to support part of the frame weight, and said device having a lower end supported on said leaf by a at a longitudinal location forward of said axle by a distance at least about 25% of the distance between the axle and the front connector, but rearward of said front connector.

2. The improvement described in claim 1 wherein:
   the longitudinal distance between the center of said air sleeve device and said axle is between about 25% and 50% of the longitudinal distance between the axis of said axle and the location where said front connector holds the front of said spring.

3. The improvement described in claim 1 wherein:
   said auxiliary load transfer device transfers to said leaf spring location more than 5% of the weight of the vehicle frame which is transferred to said leaf spring by said front and rear connectors, and the rear of said leaf spring between its connection to said axle and to said rear connector, is devoid of any load thereon that equals at least 5% of the vehicle weight transferred to said spring by said front and rear connectors.

4. The improvement described in claim 1 wherein:
   said auxiliary load transfer device comprises an air sleeve which has a chamber that can be filled with pressured air at a selected pressure to bias its upper and lower ends apart.

5. In a vehicle which has a frame, an axle holding a wheel on either side of the frame, a leaf spring on either side of the frame, each spring having front and rear ends and having a middle attached to said rear axle, and front and rear connectors attaching the front and rear ends of said spring to said frame in continuous connection therewith, the improvement comprising:
   an air sleeve device which has upper and lower ends and a chamber which can be filled with pressured gas at a chosen pressure to bias said ends apart, said upper end connected to said frame to support part of the frame weight, and said lower end supported on said leaf spring at a longitudinal location forward of said axle and rearward of said front connector
   the longitudinal distance between the center of said air sleeve device and said axle is between about 25% and 50% of the longitudinal distance between the axis of said axle and the location where said front connector holds the front of said spring.

6. The improvement described in claim 5 wherein:
   the longitudinal distance between the center of said air sleeve device and said axle is about three-eights of the longitudinal distance between the axis of said axle and the location where said front connector holds the front of said spring.

7. A method for improving the ride in a vehicle that has a leaf spring lying over an axle of the vehicle, while retaining highly resilient support of the vehicle frame by the spring, comprising:
   placing an air sleeve between said leaf spring and frame at a location between said spring ends, to support some of the weight of the frame onto the middle portion of the spring, while continuing to support part of the vehicle frame weight through each end of the spring;
   said location of said air sleeve lies at a distance forward of the axle which is between 25% and 75% of the total distance between the axle and the forward end of the spring.

8. The method described in claim 7 including:
   leaving the rear portion of said leaf spring, between the axle and the rear end of the spring, free of a load-carrying connection to the vehicle frame.

* * * * *

United States Patent [19]

Miyada

[11] Patent Number: 4,598,931
[45] Date of Patent: Jul. 8, 1986

[54] INERTIAL SAFETY NET SYSTEM

[76] Inventor: Thomas S. Miyada, P.O. Box 430, Summit, N.J. 07901

[21] Appl. No.: 693,679

[22] Filed: Jan. 22, 1985

[51] Int. Cl.$^4$ .............................................. B60R 21/06
[52] U.S. Cl. .................................... 280/749; 280/753; 180/282
[58] Field of Search ...................... 280/751, 748, 749; 280/753; 180/749

[56] References Cited

U.S. PATENT DOCUMENTS

| | | | |
|---|---|---|---|
| 2,025,822 | 12/1935 | Pryor | 280/749 |
| 2,942,913 | 6/1960 | Felts | 280/749 |
| 3,814,459 | 6/1974 | Eckels | 280/753 |
| 4,300,788 | 11/1981 | Sperling | 280/753 |
| 4,488,691 | 12/1984 | Lorch | 280/89 |
| 4,500,135 | 2/1985 | Kincheloe | 280/751 |
| 4,538,832 | 9/1985 | Anderson | 280/801 |

Primary Examiner—John J. Love
Assistant Examiner—Karin L. Ferriter

[57] ABSTRACT

A safety device for a vehicle that uses inertia to prevent the upper body of an occupant from colliding with the windshield. A pair of bars are slidingly held to the underside of the vehicle's roof. The bars each have a row of gear teeth in engagement with a semi-circular gear. A net is secured to the semi-circular gears so that as inertia causes the sliding bars to move forward the gears turn and introduce the net between the occupants and the windshield. A ratchet wheel assembly prevents the safety device from moving backwards unless the pawls are manually released.

4 Claims, 14 Drawing Figures